United States Patent
Schnaibel et al.

(10) Patent No.: US 6,216,451 B1
(45) Date of Patent: Apr. 17, 2001

(54) METHOD OF DIAGNOSING AN NOX STORAGE CATALYTIC CONVERTER DURING OPERATION OF AN INTERNAL COMBUSTION ENGINE

(75) Inventors: Eberhard Schnaibel, Hemmingen; Klaus Winkler; Bernd Schumann, both of Rutesheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/234,118

(22) Filed: Jan. 19, 1999

(30) Foreign Application Priority Data

Jan. 17, 1998 (DE) ............................................. 198 01 625

(51) Int. Cl.$^7$ ...................................................... F01N 3/00
(52) U.S. Cl. ................................ 60/277; 60/285; 60/274; 60/295; 60/301
(58) Field of Search ............................. 60/274, 277, 295, 60/285, 301

(56) References Cited

U.S. PATENT DOCUMENTS 5,201,802 * 4/1993 Hirota et al. ........................... 60/301
5,335,538 * 8/1994 Blischke et al. ....................... 60/277
5,713,199 * 2/1998 Takeshima et al. ................... 60/277

FOREIGN PATENT DOCUMENTS

| 0690213 | 1/1996 | (EP) . |
| 0733786 | 9/1996 | (EP) . |
| 0735250 | 10/1996 | (EP) . |
| 2318418 | 4/1998 | (GB) . |

* cited by examiner

Primary Examiner—Thomas Denion
Assistant Examiner—Diem Tran
(74) Attorney, Agent, or Firm—Walter Ottesen

(57) ABSTRACT

The invention is directed to diagnosing a catalytic converter capable of storing nitrogen oxides and mounted in the exhaust-gas system of an internal combustion engine. A signal-emitting exhaust-gas probe is provided rearward of the catalytic converter and the exhaust gas forward of the catalytic converter is influenced by increasing components in the exhaust gas which are effective as a reducer thereby triggering a change of the signal. The time elapsed between the start of the influencing and the change of the signal is evaluated to diagnose the catalytic converter.

12 Claims, 4 Drawing Sheets

METHOD OF DIAGNOSING AN NOX STORAGE CATALYTIC CONVERTER DURING OPERATION OF AN INTERNAL COMBUSTION ENGINE

FIELD OF THE INVENTION

The invention relates to the diagnosis of catalytic converters which are used to convert toxic substances in the exhaust gas of internal combustion engines. The invention especially relates to the diagnosis of an NOx storage catalytic converter during the operation of an internal combustion engine.

BACKGROUND OF THE INVENTION

The three-way catalytic converter no longer satisfies the requirements as to the conversion of nitrogen oxide in one operating region of the combustion of lean air/fuel mixtures ($\lambda>1$). Here, NOx storage catalytic converters are used which store the nitrogen oxides emitted in lean engine operation. Stored nitrates are released and converted to nitrogen by the operation of the engine in the rich region ($\lambda<1$).

The use of NOx storage catalytic converters in this connection is disclosed, for example, in U.S. Pat. No. 5,473,887.

Statutory requirements provide for an on-board diagnosis of the vehicle components, which are relevant to toxic emissions, such as catalytic converters. In this connection, it is known, for example, from U.S. Pat. No. 3,969,932, to apply the signals of oxygen-sensitive exhaust gas probes, which are mounted forward and rearward of the catalytic converter, for evaluating a three-way catalytic converter. The known method is based upon the oxygen storage capability of an operational three-way catalytic converter. In this connection, U.S. Pat. No. 3,969,932 discloses a change of the air/fuel mixture composition from $\lambda=0.95$ (rich, fuel-rich mixture, oxygen deficiency) to $\lambda=1.05$ (lean, fuel-poor mixture, oxygen excess). The exhaust-gas sensor mounted forward of the catalytic converter reacts thereto virtually without delay. The oxygen storage locations of the catalytic converter are at first not occupied because of the oxygen deficiency in the exhaust gas, which is present for $\lambda=0.95$. The oxygen storage locations are successively occupied after the switchover to the oxygen excess forward of the catalytic converter. Accordingly, at first there continues to be an oxygen deficiency rearward of the catalytic converter. After a time span, which is dependent upon the oxygen storage capability of the catalytic converter, an oxygen excess also occurs rearward of the catalytic converter which triggers a change of the signal of the rearward exhaust-gas sensor. The time delay, that is, the phase shift between the reactions of both exhaust-gas sensors, is less with decreasing capability of oxygen storage of the catalytic converter and can therefore be used for evaluating the oxygen storage capability for diagnosing the catalytic converter.

This known method is not easily transferrable to a catalytic converter, which in addition to a storage capability for oxygen also has a storage capability for nitrogen oxides. Catalytic converters of this kind can usually still store nitrogen oxides when their oxygen storage capability is already exhausted and an exhaust-gas sensor, which is mounted rearward of the catalytic converter, indicates an oxygen excess. The time delay between the reactions of both exhaust-gas sensors after a changeover from rich to lean mixture therefore supplies no statement for NOx storage catalytic converters as to their NOx storage capability.

SUMMARY OF THE INVENTION

It is an object of the invention to provide a method and an arrangement for evaluating the NOx storage capability of an NOx storage catalytic converter, which can be realized with components, which are already available in modern motor vehicles such as oxygen-sensitive exhaust-gas sensors forward and rearward of the catalytic converter.

The method of the invention is for diagnosing a catalytic converter capable of storing nitrogen oxides and the catalytic converter is mounted in the exhaust-gas system of an internal combustion engine. The method includes the steps of: providing a signal-emitting exhaust-gas probe rearward of the catalytic converter; influencing the exhaust gas forward of the catalytic converter by increasing components in the exhaust gas which are effective as a reducer thereby triggering a change of the signal; and, evaluating the time elapsed between the start of the above-mentioned influencing and the change of the signal to diagnose the catalytic converter.

The invention is based on the consideration that an oxygen deficiency in the exhaust gas rearward in the catalytic converter only occurs when the oxygen-storage locations as well as the nitrogen oxide storage locations in the catalytic converter is first filled with oxygen and with nitrogen oxides, for example, because of an operation of the engine with a lean mixture, and if hydrocarbons (HC) and carbon monoxide (CO) are generated in the exhaust gas for the regeneration of the catalytic converter because of a rich mixture adjustment, then the following processes take place: the hydrocarbons and the carbon monoxide reduce the stored nitrogen oxides. The oxygen stored and bonded in the form of nitrogen oxides is released with the remaining oxygen stored in the catalytic converter so that the oxygen excess is at first maintained rearward of the catalytic converter.

The exhaust-gas sensor, which is arranged rearward of the catalytic converter, reacts only to the oxygen deficiency forward of the catalytic converter when the oxygen storage locations as well as the nitrogen oxide storage locations of the catalytic converter are empty. The time delay between the influencing of the exhaust gas forward of the catalytic converter because of the introduction of the reduction agents and the reaction of the rearward exhaust-gas probe is therefore dependent also upon the NOx storage capability and can therefore serve in the evaluation of the NOx storage capability.

A conventional oxygen-sensitive lambda probe or, for example, an HC sensor can be utilized as a sensor which is mounted rearward of the catalytic converter.

The invention is not limited to a rich control of the engine for making HC and CO available in the exhaust gas as reducing agents. The reducing agent can also be metered in a controlled manner from other sources such as urea from a supply tank.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
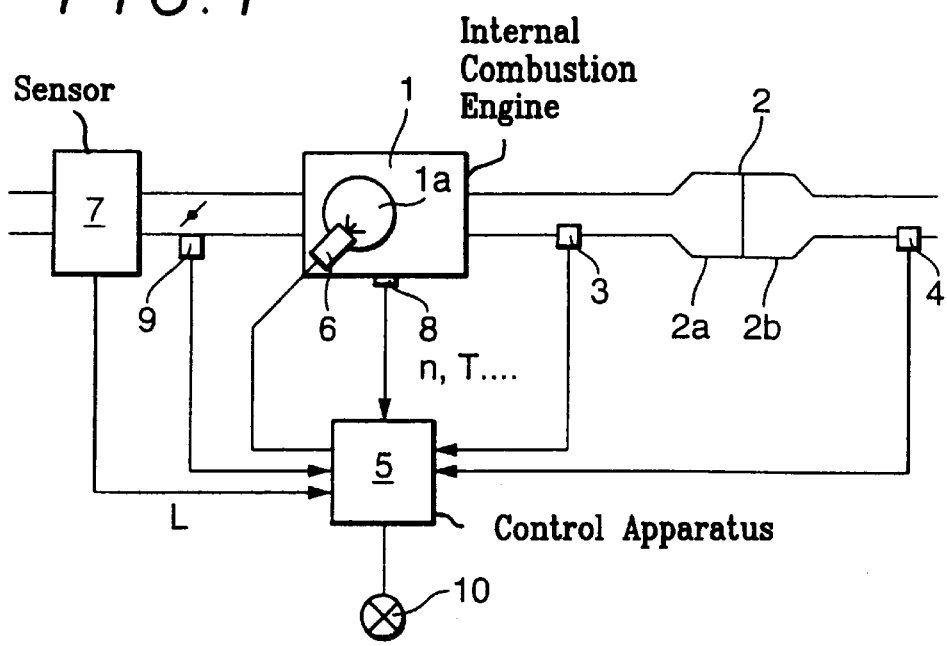
FIG. 1 shows the technical background in which the invention is effective.

FIG. 1 shows an internal combustion engine 1 having a catalytic converter 2, exhaust-gas probes 3 and 4, a control apparatus 5, a fuel-metering device 6, and different sensors 7, 8 and 9. The sensors are for load L and the rpm (n) as well as additional operating parameters of the engine, as may be required, such as temperatures, throttle flap position, et cetera. The catalytic converter includes a first part 2a and a second part 2b. Part 2a defines the NOx-storage catalytic converter. Part 2b represents an integrated or downstream oxygen store.

The control apparatus forms, inter alia, fuel-metering signals from the above-mentioned input signals and, if required, other input signals. The fuel-metering means 6 is driven with these fuel-metering signals. The fuel-metering means can be configured for a so-called intake manifold injection as well as for a gasoline direct injection into the combustion chambers 1a of the individual cylinders. The variation of the mixture composition can take place via a change of the injection pulsewidth with which the fuel-metering means is driven. With this background, the essence of the method of the invention concerns mostly the following: the control apparatus 5, the exhaust-gas probe, which is mounted rearward of the catalytic converter, and the means 10 for indicating and/or storing a statement as to the storage capability.

Figure 2A:
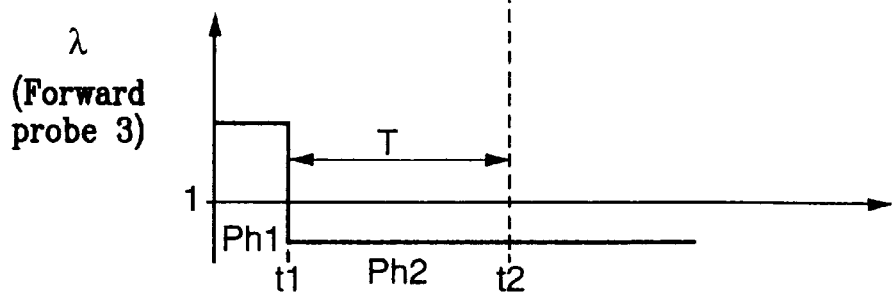
FIGS. 2a and 2b show signal traces for explaining the invention.
Figure 2B:
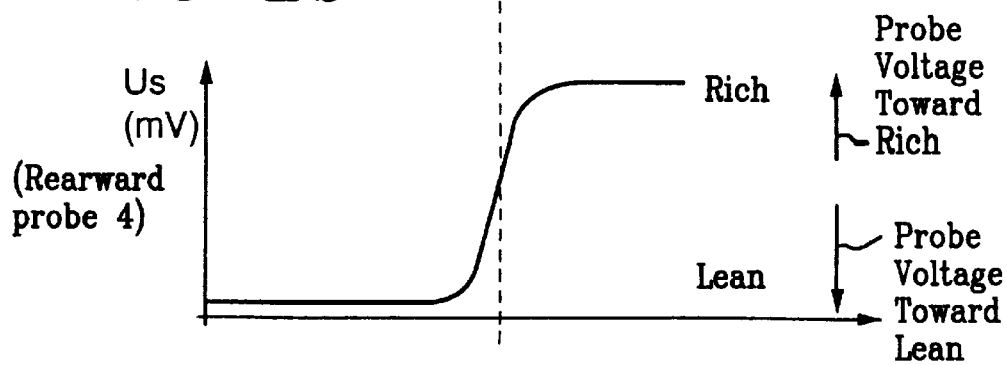

FIGS. 2a and 2b show the change in the mixture composition forward of the catalytic converter (FIG. 2a) in combination with the signal US of the rearward exhaust-gas probe 4 (FIG. 2b) for an embodiment of the invention.

In a first phase Ph1, the engine is driven with $\lambda>1$, that is, with an excess of air. The lower signal level of the rearward probe in FIG. 2b shows that air or oxygen excess is present also rearward of the catalytic converter. At time point t1, the mixture composition of $\lambda>1$ changes to $\lambda<1$, that is, the mixture composition is changed over to oxygen deficiency.

At time point t2, the rearward sensor 4 responds to the oxygen deficiency with an increase of its signal from a low level to the high level. For the reasons presented above, the time duration $T=(t2-t1)$ is a measure or index for the sum of the NOx storage capability and for the oxygen storage capability of the catalytic converter system. Stated otherwise, the time T is a quantity suitable for quantitative evaluation. As is apparent in FIG. 2b, the time point t2 can be determined, for example, by a threshold value of the signal of the rearward probe being exceeded.

Figure 3:
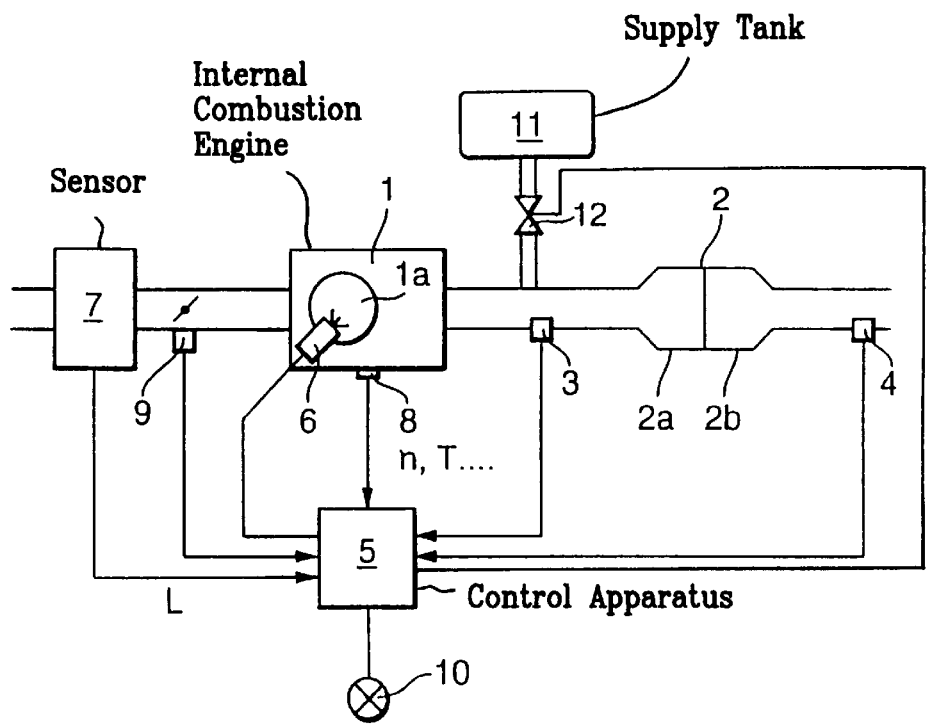
FIG. 3 is a further embodiment of an arrangement which is suitable for carrying out the invention.

The time t1 can be detected directly in the control apparatus. For a jump-like or abrupt control reversal of $\lambda$, t1 is the time point starting at which the injection pulse widths are increased. In this case, t1 is still burdened with the imprecision of the gas running time between start of injection and the time point at which the combustion products reach the catalytic converter. This time is, however, small compared to the time T and can therefore be neglected in a first approximation. If a higher precision of the determination of the time point t1 is desired, then the time point of the signal level change of the forward exhaust-gas probe 3 can be used. The change of the mixture composition shown leads to the situation that the engine emits hydrocarbon substances and carbon monoxide as reducing agents. Alternative to the emission of exhaust-gas components which effect reduction, the reduction agent can also be taken from a supply tank 11 via a valve 12 and supplied to the exhaust gas forward of the catalytic converter. The valve 12 is driven by the control apparatus 5. The engine can then be driven continuously with a lean mixture. A corresponding change of the structure of FIG. 1 is shown in FIG. 3.

FIGS. 4a to 4c and FIGS. 5a and 5b show, based on signal traces, how the invention can be incorporated into an open-loop or closed-loop control method of metering fuel of an internal combustion engine in combination with an NOx-storage catalytic converter.

The internal combustion engine is alternately driven in first phases Ph1 with a lean mixture (lower on fuel compared to the stochiometric ($\lambda=1$) mixture composition) and in second phases Ph2 with a rich mixture. In the first phases, the NOx catalytic converter stores the NOx emissions of the engine. In the second phases, a defined enrichment regenerates the storage catalytic converter. The regeneration takes place via a reduction of the stored nitrate to nitrogen (N2). The store 2a must be almost completely emptied and therefore adequate reducing agents must be supplied in order to achieve high storage and conversion rates of the NOx-storage catalytic converter.

Figure 4A:
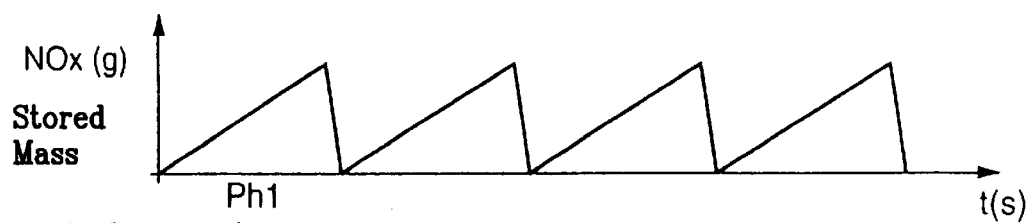
FIGS. 4a to 4c.
Figure 4B:
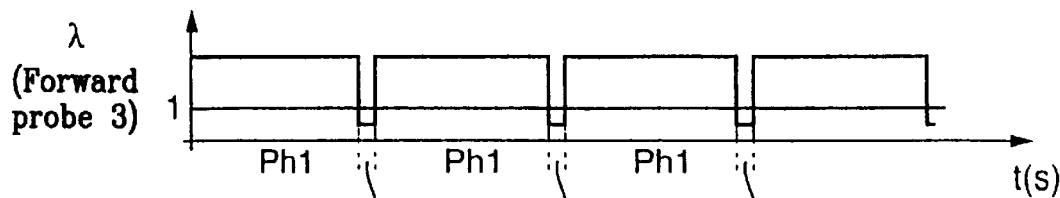
Figure 4C:
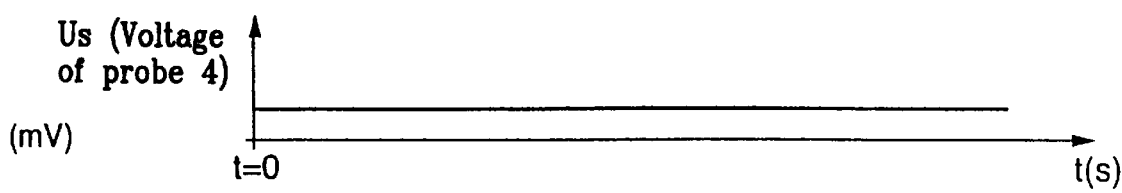

FIGS. 4a to 4c show the phase change in connection with a diagram showing the stored NOx quantity (FIG. 4a) and the corresponding air/fuel ratio $\lambda$ as detected by the exhaust-gas probe 3 mounted forward of the catalytic converter (FIG. 4b) and the signal trace of the exhaust-gas probe 4, which is mounted rearward of the catalytic converter, for the ideal case to be sought with a complete charge and emptying of the NOx-storage catalytic converter (FIG. 4c).

At time point t=0, the NOx-storage catalytic converter is empty. In the following first phase Ph1, the engine is driven with a lean mixture ($\lambda>1$). The nitrogen oxides emitted thereby are stored in the storage catalytic converter. The first phase (lean phase) is ideally ended when the storage catalytic converter 2a is full. A second phase Ph2 follows after the first phase and the storage catalytic converter is regenerated in this second phase. In this embodiment, the regeneration takes place with the aid of a rich engine operation in the phase Ph2. Here, the engine, which operates with a fuel-rich mixture, emits uncombusted HC and CO as reduction agents. Under the influence of the catalytic converter, the reduction agent reacts with the stored nitrogen oxides to form water, CO and N2 which are transported further with the exhaust gas. The store is thereby again made capable of receiving nitrogen oxides, that is, the store is regenerated. The control apparatus 5 continuously alternates between the phases Ph1 and Ph2.

In the ideal case, the regeneration (phase 2) takes place up to a complete emptying of the storage catalytic converter 2a and ends before the reduction agent occurs in excess rearward of the catalytic converter. The occurrence of excessive reduction agent is associated with oxygen deficiency and can therefore be detected by an oxygen-sensitive exhaust-gas sensor 4. As an alternative thereto, excessive hydrocarbons can be detected directly with an HC sensor in lieu of or as a supplement to the oxygen-sensitive exhaust-gas sensor 4.

According to FIG. 4a, the storage catalytic converter is completely empty at the end of each rich phase Ph2 and, according to FIG. 4c, the signal performance of the exhaust-gas sensor 4 which is mounted rearward of the catalytic converter, does not change thereby. The illustrated low level of the sensor signal represents an oxygen excess and therefore the consumption-optimized lean operation of the engine which mostly occurs averaged over time.

An exact computation of the required quantity of reduction agent in engine operation is not possible. For this reason, the catalytic converter 2 is advantageously configured as a NOx-storage catalytic converter having an integrated oxygen storage capability or is configured as a conventional three-phase way catalytic converter having an oxygen store 2b which serves as a buffer. An impermissibly high supply of reduction agents CO and HC reacts with the oxygen stored in the oxygen store 2b. The downstream oxygen store is ideally only emptied by one half by the excess reduction agent. The downstream connected oxygen store permits a certain excessive metering of the reduction agent which is advantageous to ensure the complete emptying of the storage catalytic converter 2a. The sought-after emptying of the oxygen store to half makes a compensation of metering inaccuracies possible which, in real operation, is unavoidable.

Figure 5A:
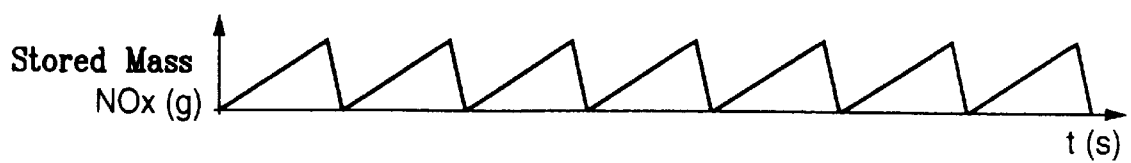
FIG. 5 explain the invention in the context of signal traces in combination with an open-loop or closed-loop control of the metering of fuel of an internal combustion engine having an NOx storage catalytic converter; and, FIG. 6 shows an embodiment of the method of the invention in the context of a flowchart.
Figure 5B:
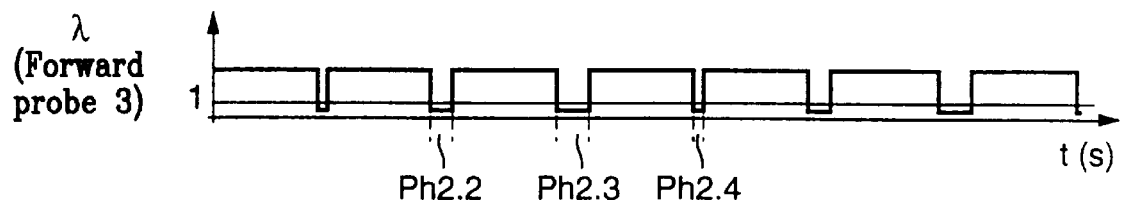
Figure 5C:
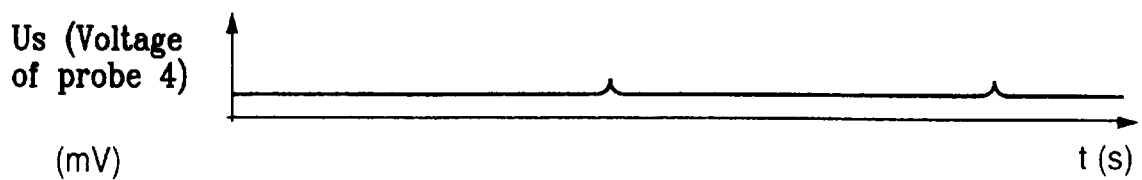

FIGS. 5a to 5c show an embodiment of the invention built upon the presentation of FIGS. 4a to 4c.

As shown in FIG. 5c, the control of the internal combustion engine first takes place in that the sensor 4, which is mounted rearward of the catalytic converter, does not change its signal behavior and remains at a level characteristic for a lean mixture. This can mean that the length of the rich phases is already optimal; that is, the length of the rich phases, except for metering inaccuracies, corresponds to the requirement so that the storage catalytic converter 2a is completely regenerated. The metering inaccuracies are buffered by the oxygen storage catalytic converter 2b. However, it can also occur that the length of the rich phases is not sufficient for a complete regeneration of the storage catalytic converter. In a manner of tests, the lengths of the rich phases are therefore successively increased. At the end of the third rich phase Ph2.3, the reducing agent amount exceeds the amount pregiven by the regeneration requirement 2a plus the buffer quantity 2b. This has the consequence that an oxygen deficiency develops rearward of the catalytic converter in combination with an excess with the reduction agents, such as CO and HC.

FIG. 5c shows the resulting change of the signal performance of the exhaust-gas sensor 4 which, for example, can be detected by a threshold value comparison as shown in FIG. 2b. The length of the rich phase Ph3 is, according to the invention, an index for the NOx storage capability.

The rich phase Ph2.3, which corresponds to the triggering of the signal change, is therefore too long in order to be buffered by the catalytic converter system 2; whereas, the previous rich phase Ph2.2 was not yet long enough in order to trigger a reaction. The actual reduction agent requirement can therefore be determined with a precision which is determined by the stepwidth of the successive lengthenings.

The following rich phases Ph2.4, et cetera, are shortened. The extent of the shortening is so dimensioned that the storage catalytic converter is still completely regenerated, however, the oxygen storage catalytic converter 2b is only emptied approximately half. Thereafter, the method is repeated and the rich phases are therefore again successively lengthened. The lengthening must, however, not be started immediately. It is also conceivable to store the value, which is determined as being optimal, for the actual operating point and to start a new adaptation operation only upon the entry of predetermined conditions, such as after the elapse of a certain time.

As an alternative to successive changes of the rich phases, a successively occurring increase of the degree of richness can be carried out. Both alternatives can also be combined.

The reduction agent quantity, which is supplied up to the reaction of the rearward sensor, is dependent upon the total storage capability of the catalytic converter system. According to the invention, the quantity of the supplied reduction agent is detected for the evaluation of the storage capability. This can, for example, take place via a detection of the regeneration time duration Ph2.3 up to the breakthrough of the reduction agent. This time duration corresponds to the time T, which is explained above, and can be used, for example, via a threshold value comparison for the diagnosis of the catalytic converter. Alternatively, the supplied reduction agent quantity can be compared to a threshold value. The greater the quantity supplied up to the breakthrough, the greater is the storage capability of the catalytic converter.

When supplying the reduction agent in accordance with FIG. 3, the quantity can, for example, be determined from the drive signal for the valve 12. For an emission reducing exhaust-gas component, the quantity can be determined, for example, from the signal of the forward probe 3 and the intake air quantity. The intake air quantity mirrors the entire gas flow in the catalytic converter and the exhaust-gas probe signal supplies a signal as to the portion of the reduction agent. The interrelationships between reducing agent quantity, sensor signal, and air quantity can, for example, be determined by experiment and stored in a characteristic field in the control apparatus 5.

Figure 6:
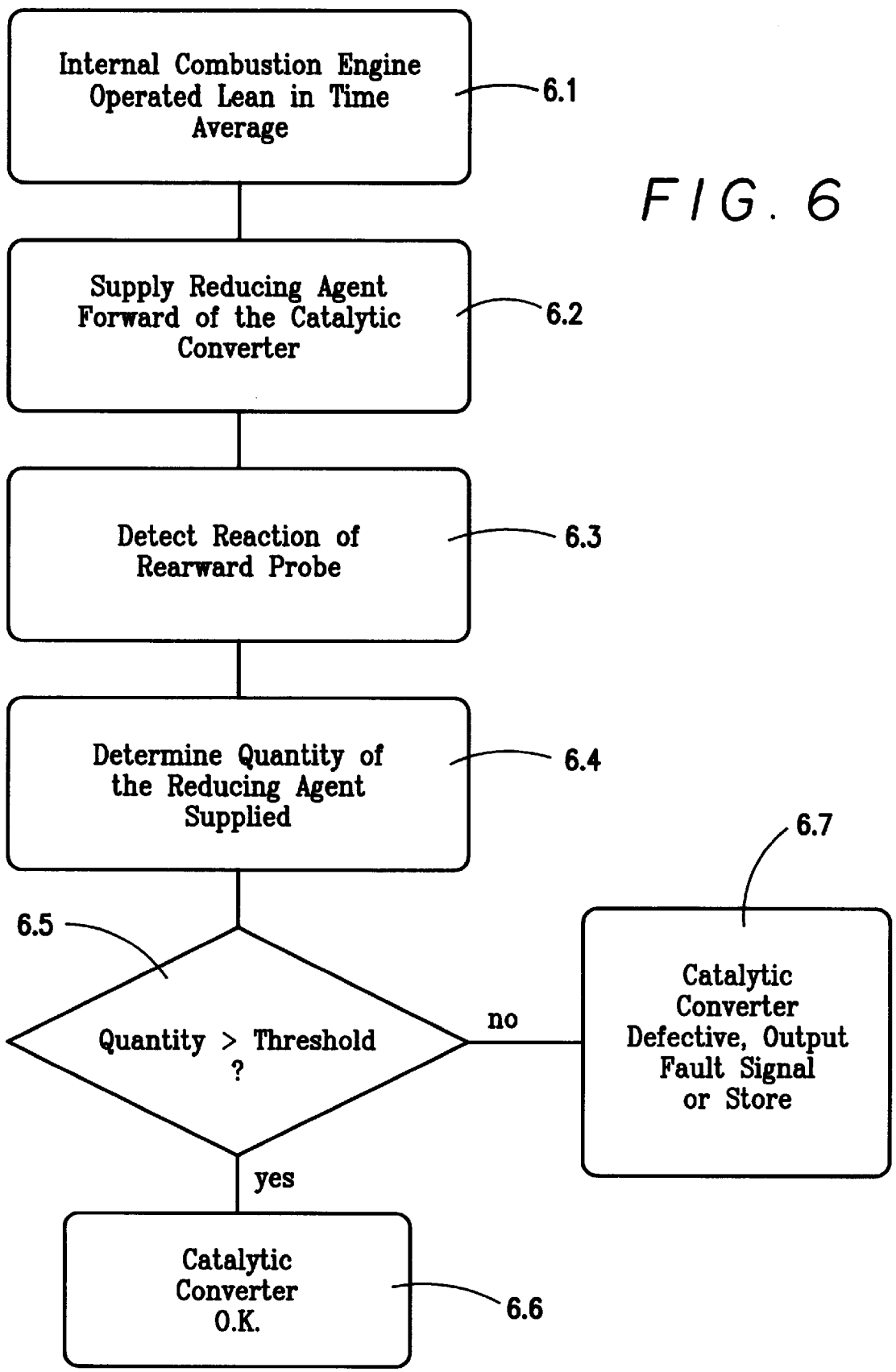

The flowchart in FIG. 6 defines the sequence as an embodiment of the invention. The step 6.4 includes the alternatives described above in the text. The reaction time T is especially considered for the supplied reduction agent quantity.

It is understood that the foregoing description is that of the preferred embodiments of the invention and that various changes and modifications may be made thereto without departing from the spirit and scope of the invention as defined in the appended claims.

What is claimed is:

1. A method for diagnosing a catalytic converter of an internal combustion engine having an exhaust-gas system and said catalytic converter being for storing nitrogen oxides, the catalytic converter being mounted in the exhaust-gas system of said internal combustion engine, the method comprising the steps of:

providing a signal-emitting exhaust-gas probe rearward of said catalytic converter;

operating on said exhaust gas forward of said catalytic converter by carrying out one of the following additional steps: increasing the length of rich phases successively or increasing the degree of enrichment of said rich phases successively to increase components in said exhaust gas which are effective as a reducer until a deficiency of oxygen occurs downstream of said catalytic converter which triggers a change of said signal; and, evaluating the time elapsed between the start of said operating on said exhaust gas and said change of said signal to diagnose said catalytic converter with the length of the rich phase present when said signal chance is triggered corresponding to the sum of oxygen and said nitrogen oxides stored in said catalytic converter.

2. The method of claim 1, comprising the further step of triggering said change of said signal by operating on said exhaust gas forward of said catalytic converter by increasing the quantity of fuel supplied to said engine.

3. The method of claim 1, comprising the further step of triggering said change of said signal by adding a reducing agent to said exhaust gas forward of said catalytic converter.

4. The method of claim 1, wherein said signal-emitting exhaust-gas probe is a first exhaust-gas probe; and, wherein said method comprises the further steps of:

providing a second exhaust-gas probe and mounting said second exhaust-gas probe forward of said catalytic converter; and, detecting said start of said influencing from the change of the signal of said second exhaust-gas probe.

5. The method of claim 1, comprising the further steps of:

controlling the air/fuel ratio of said engine in first phases with a mixture, which is leaner in fuel compared to the stoichiometric mixture composition, and in second phases with a mixture richer in fuel;

detecting the time duration of one of said second phases which leads to a reaction of said exhaust-gas probe rearward of said catalytic converter; and, evaluating said time duration as a criterion for said diagnosis.

6. An arrangement for diagnosing a catalytic converter of an internal combustion engine having an exhaust-gas system and said catalytic converter being for storing nitrogen oxides, the catalytic converter being mounted in the exhaust-gas system of said internal combustion engine, the arrangement comprising:

a signal-emitting exhaust-gas probe mounted rearward of said catalytic converter;

means for operating on said exhaust gas forward of said catalytic converter by increasing the length of rich phases successively or increasing the decree of enrichment of said rich phases successively to increase components in said exhaust gas which are effective as a reducer until a deficiency of oxygen occurs downstream of said catalytic converter which triggers a change of said signal of said exhaust-gas probe; and, means for detecting and evaluating the time elapsed between the start of said operating on said exhaust gas and said change of said signal to diagnose said catalytic converter with the length of the rich phase present when said signal change is triggered corresponding to the sum of oxygen and nitrogen oxides stored in said catalytic converter.

7. The arrangement of claim 6, wherein said exhaust-gas probe is sensitive to oxygen.

8. The arrangement of claim 6, wherein said exhaust-gas probe is a first exhaust-gas probe for emitting a first signal; and, wherein the arrangement further comprises a second exhaust-gas probe mounted forward of said catalytic converter for emitting a second signal; and, said detecting and evaluating means functioning to detect said elapsed time as a phase shift between said first and second signals.

9. The arrangement of claim 6, further comprising means for increasing the quantity of fuel supplied to said engine to influence said exhaust gas forward of said catalytic converter to increase said components in said exhaust gas which are effective as a reducer.

10. The arrangement of claim 6, further comprising means for adding a reducing agent to said exhaust gas forward of said catalytic converter for increasing said components in said exhaust gas which are effective as a reducer.

11. The method of claim 1, wherein said sum is a quantity suitable for evaluating the state of deterioration of said catalytic converter.

12. The arrangement of claim 6, wherein said sum is a quantity suitable for evaluating the state of deterioration of said catalytic converter.

\* \* \* \* \*

UNITED STATES PATENT AND TRADEMARK OFFICE
CERTIFICATE OF CORRECTION

PATENT NO. : 6,216,451 B1
DATED : April 17, 2001
INVENTOR(S) : Eberhard Schnaibel, Klaus Winkler and Bernd Schumann It is certified that error appears in the above-identified patent and that said Letters Patent is hereby corrected as shown below:

<u>Title page,</u>
Item [56], References Cited, add
--  3,969,932  *  07/1996  Rieger et al
    5,473,887  *  12/1995  Takeshima et al --.

<u>Column 6,</u>
Line 58, delete "chance" and substitute -- change -- therefor.

<u>Column 7,</u>
Line 30, delete "decree" and substitute -- degree -- therefor.

Signed and Sealed this

Twelfth Day of November, 2002

Attest:

JAMES E. ROGAN
Attesting Officer        Director of the United States Patent and Trademark Office